(12) United States Patent
Ohsumimoto

(10) Patent No.: US 7,972,456 B2
(45) Date of Patent: Jul. 5, 2011

(54) METHOD OF PRODUCING TIRE

(75) Inventor: Hiroki Ohsumimoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1032 days.

(21) Appl. No.: 11/666,928

(22) PCT Filed: Nov. 2, 2005

(86) PCT No.: PCT/JP2005/020230
§ 371 (c)(1),
(2), (4) Date: Jun. 25, 2007

(87) PCT Pub. No.: WO2006/049222
PCT Pub. Date: May 11, 2006

(65) Prior Publication Data
US 2008/0314494 A1    Dec. 25, 2008

(30) Foreign Application Priority Data

Nov. 4, 2004 (JP) .................................. 2004-320306
Jan. 28, 2005 (JP) .................................. 2005-021096

(51) Int. Cl.
*B29D 30/72* (2006.01)
(52) U.S. Cl. ........................ 156/116; 152/524; 156/130.7
(58) Field of Classification Search .................. 156/117, 156/130, 130.7, 116; 152/523–525
See application file for complete search history.

(56) References Cited

U.S. PATENT DOCUMENTS

| | | | |
|---|---|---|---|
| 1,448,286 A * | 3/1923 | Comstock | 264/139 |
| 3,769,123 A | 10/1973 | Botts et al. | |
| 6,619,355 B1 * | 9/2003 | Niizato | 152/523 |
| 2005/0145314 A1 * | 7/2005 | Ikeda et al. | 152/458 |
| 2006/0000530 A1 * | 1/2006 | Hirai | 152/450 |
| 2006/0048878 A1 * | 3/2006 | Ogawa | 152/524 |

FOREIGN PATENT DOCUMENTS

| | | |
|---|---|---|
| EP | 1 211 057 A2 | 6/2002 |
| EP | 1 555 114 A1 | 7/2005 |

(Continued)

OTHER PUBLICATIONS

Supplementary European Search Report dated Nov. 17, 2008 (7 pages).

(Continued)

*Primary Examiner* — Geoffrey L Knable
(74) *Attorney, Agent, or Firm* — Sughrue Mion, PLLC

(57) ABSTRACT

There is provided a method of producing a tire comprising the steps of: applying a chafer rubber 21 by spirally winding a rubber ribbon onto a base 15; applying a sidewall rubber 22 of a first color by spirally winding a rubber ribbon at a position on the base 15 spaced from the position where the chafer rubber is stuck; applying a sidewall rubber 23 of the second color by spirally winding a rubber ribbon between the chafer rubber sticking position and the first color sidewall rubber sticking position; and applying a cover rubber 24 of the first color over the entire surface of the sidewall rubber of the second color, wherein on the occasion when said chafer rubbers 21 or sidewall rubbers 23 of the second color are stuck, they are applied so that they are adjacent to each other, thereby sticking a rubber member of a colored tire onto the sidewall of the tire without involving defects such as trapped air and a bare as well as severe decrease of the productivity.

5 Claims, 6 Drawing Sheets

FOREIGN PATENT DOCUMENTS

| | | | |
|---|---|---|---|
| EP | 1584493 | A1 | 12/2005 |
| GB | 1017464 | * | 1/1966 |
| JP | 39014056 | B | 12/1961 |
| JP | 39-14056 | B1 | 7/1964 |
| JP | 62-134304 | A | 6/1987 |
| JP | 4-275136 | A | 9/1992 |
| JP | 11-124471 | A | 5/1999 |
| JP | 2000-335212 | A | 12/2000 |
| JP | 2001-179849 | A | 7/2001 |
| JP | 2002-127718 | A | 5/2002 |
| JP | 2002-200677 | A | 7/2002 |
| WO | WO 2004/037524 | A1 | 5/2004 |
| WO | WO-2004048129 | A1 * | 6/2004 |

OTHER PUBLICATIONS

Japanese Office Action dated Feb. 1, 2011.
European Office Action for EP Application No. 05 805 539.3-2307 dated Mar. 30, 2011.

* cited by examiner (a)

(b)

METHOD OF PRODUCING TIRE

FIELD OF THE INVENTION

The present invention relates to a method of producing a tire having a rubber chafers which are arranged outside, in a width direction, of each of a pair of bead cores and which are tinted in a first color, and sidewalls which are arranged adjacently outside, in a radical direction, of each of the rubber chafers and which are also tinted in the first color, the sidewalls being provided with a rubber portion which is shown as letters or pattern of a second color, and especially relates to a method capable of improving a manufacturing efficiency.

RELATED ART

In order to achieve high accuracy of shapes of product tires and dimensions of their members, a tire producing method has been proposed, in which method a green tire is built by applying tire component members on outside of a base which is secured onto a rigid core or a building drum and which consists of members including a carcass and a bead core and the green tire is then vulcanized. In this method, among tire component members, rubber members are stuck by winding a consecutive rubber ribbon multiple times. According to this method, in comparison to a case in which a rubber having a cross section corresponding to a cross section of the members in the product tire is winded only once to form the rubber member, it is no longer necessary to extrude a rubber member with a larger cross section so that a extrusion machine can be downsized and, furthermore, a rubber ribbon extruded from the downsized extrusion machine can be winded directly onto a toroidal carcass member to thereby render a large amount of intermediate stock of the members needed conventionally for producing other types of tires.

In addition, even on the occasion when green tires in different sizes are built, members having different cross sections can be formed by using rubber ribbons having identical cross sectional shape and changing only number of times and/or positions of winding the rubber ribbons, so that the method has a feature that green tires having different sizes can be built continuously.

Furthermore, in tires consisting of rubber members formed by winding rubber ribbons multiple times in this way, each member does not have a joint extending overall width of the member, and, therefore, high quality can be achieved in terms of uniformity and tire balance.

Based on the above-mentioned background, proposed is a method of producing a tire having a letter or pattern in a color different from the color of surroundings on at least one of the sidewalls (hereinafter referred to as "colored tire"), wherein a rubber member is stuck by winding rubber ribbons spirally (see, for example, Patent Document 1).

FIG. 1 are perspective view showing an example of the above-mentioned colored tires. The tire 1 shown in FIG. 1(a) is a tire provided on a sidewall with an annular line 2 as a kind of pattern, and while surrounding portion 3 tinted in the first color, the line 2 tinted in the second color. Generally, black and white are used as the first and second colors, respectively, and these colors can be given by compounding a coloring agent to form a rubber which exposes to the surface of the tire.

The tire 1A shown in FIG. 1(b) is an example in which letters 4 of the second color are indicated in the surrounding portion 5 tinted in the first color.

FIGS. 2 and 3 show sections of tires sequentially in the process of building the colored tire exemplified in FIGS. 1(a) and 1(b) by winding the rubber ribbon spirally to apply the rubber member such as a chafer rubber and sidewall rubber according to the conventional method. In this method, a base 15 is firstly formed by applying a carcass 12, both bead cores 13 and a tread 14 as well as tire component members such as an inner liner and belts onto a core body 11 which consists of a building drum or rigid core and has a exterior shape approximate to the interior surface of a product tire. Then, as shown in FIG. 2(a), a rubber ribbon is winded spirally to apply a chafer rubber 91.

Thereafter, as shown in FIG. 2(b), sidewall rubbers 92A, 92B of the first color are respectively applied on the base 15 by winding the rubber ribbon spirally. In this occasion, one sidewall rubber 92A of the first color is arranged to be adjacent to and radially outside of the chafer rubber 91 while the other sidewall rubber 92B of the first color is so arranged that it is spaced from the sidewall rubber 92A and constitutes the radially outer side of the sidewall.

Subsequently, as shown in FIG. 2(c), the rubber ribbon is winded spirally to fill the area formed between the sidewall rubbers 92A and 92B, so that a sidewall rubber 93 tinted in the second color is stuck.

As shown in FIG. 3(a), a cover rubber 94 of the first color is, then, applied by circling, for example, a sheet once to cover at least the sidewall rubber 93 of the second color to thereby building a green tire 90.

The green tire 90 is thereafter vulcanized in a mold having a concave corresponding to a portion desired to be shown as a letter or pattern of the second color. FIG. 3(b) shows a section of a tire 90A which is taken out of the mold after the vulcanization. In this tire 90A, the entire surface is covered by the first color whereas a portion desired to be shown as a letter or pattern of the second color is formed as a convex portion 96 by the concave portion of the mold.

The next step is a step of removing a top portion of the convex portion 96, in which step the thin cover rubber 94 of the first color covering the surface is removed to show the sidewall rubber portion 93a of the second color hiding beneath the cover rubber 94. This step enables to show a letter and/or pattern of the second color in a desired shape.

It is noted that the chafer rubber 91, sidewall rubber 92A, 92B, and sidewall rubber 93 in FIGS. 2 and 3 are formed by winding a rubber ribbon but the rubber ribbon is illustrated only in a figure so required for the purpose of simply drawing borders between each of the rubbers in FIGS. 2 and 3.
Patent Document 1: International Publication No. WO2004/037524

DISCLOSURE OF THE INVENTION

Problems to be Solved by the Invention

However, when a colored tire is built according to the above-mentioned method, the below-described problems have been found. That is, in the transversal sectional view, bumps formed by different rubber members as well as bumps accompanying overlaps of the rubber ribbons concentrate at a surrounding area of the sidewall rubber 92A of the first color, so that air is prone to accumulated in this area, which may cause separation of between the rubber layers. Especially, when a bump occurs at the border between the rubber members of different colors, the rubber members cannot uniformly contact with the inner surface of the mold during the vulcanization so that it is likely to cause defective appearance, i.e. so-called side bear which yields wrinkles at the surface of the sidewall.

Further, sticking the sidewall rubber can be achieved by winding one kind of rubber ribbon continuously and spirally over the entire area to be stuck if the tire is not colored, but, in the case of the colored tire, three rubber members 92A, 92B and 93 has to be winded individually and spirally so that a cycle time for applying the sidewall rubber becomes longer due to an extra time necessary to treat the start and end of the windings of the rubber ribbon. This results in a reduced productivity of the colored tire.

Moreover, when colored and uncolored tires are manufactured together in a multi-size small-lot production system in which colored and uncolored tires are mixedly feed and sequentially subjected to multiple processes in a given takt time to built green tires, the cycle time necessary to apply the sidewall rubber of the colored tire becomes a bottleneck so that the takt time has to be prolonged in concert to the cycle time. This causes not only a problem of decreasing the productivity of colored tires but also a problem of limiting the productivity of uncolored tires.

The above-mentioned problem is happened firstly when the rubber members 91, 92A, 92B and 93 are to be formed by winding a rubber ribbon spirally. If the rubber ribbon is not winded spirally, two or more of the rubber members 91, 92A, 92B and 93 are integrated in during an extrusion step and the integrated rubber is winded once and then both ends in the longitudinal direction are bonded with each other to form a rubber member. Thus, both of bumps between the rubber ribbons and at the border of the rubber members can be eliminated, and the rubber integrated during the extrusion step is applied so that the number of members of the colored tire can be the same as that of the uncolored tire. This can prevent the decrease of the productivity.

Although the method of forming a rubber member by winding a rubber ribbon spirally achieves various effects as mentioned above, new problems as mentioned above may occur when this method is applied to the colored tire. In order to practically realize an application of the method of forming a rubber member by winding a rubber ribbon spirally to colored tires, it has been demanded to solve such problems urgently.

The present invention has been done in view of these points and its object is to provide a method of producing a tire capable of forming a rubber member of the colored tire by winding a rubber ribbon spirally without involving defects such as trapped air and a bare in the sidewall as well as severe decrease of the productivity.

Means for Solving the Problem

<1> The present invention is a method of producing a tire having a pair of rubber chafers which are arranged outside, in a width direction, of each of bead cores locking both ends of a carcass and which are tinted in a first color, and a pair of sidewalls which are arranged adjacently outside, in a radical direction, of each of the rubber chafers and which are also tinted in the first color, at least one of the sidewalls being provided with a rubber portion which is shown as letters or pattern of a second color, the method comprising; a CG sticking step in which a chafer rubber is applied by spirally winding a rubber ribbon onto a base consisting of members including said carcass and said bead core; a first color SG sticking step in which a sidewall rubber of the first color is applied by spirally winding a rubber ribbon at a position on the base spaced from the position where the chafer rubber is stuck; a second color SG sticking step in which a sidewall rubber of the second color is applied by spirally winding a rubber ribbon between the chafer rubber sticking position and the first color sidewall rubber sticking position; a first color cover rubber sticking step in which a cover rubber of the first color is applied over the entire surface of the sidewall rubber of the second color; a vulcanizing step in which the tire is vulcanized in a mold having concave portion corresponding to the letter or pattern of the second color; and a second color tinting step in which the letter or pattern of the second color is allowed to appear by removing at least a part of a convex portion of a tire corresponding to the concave portion of said mold; wherein on the occasion when said chafer rubbers or sidewall rubbers of the second color are stuck, said chafer rubbers or sidewall rubbers of the second color are applied so that they are adjacent to each other.

<2> One aspect of the present invention is the method of producing a tire according to the item <1>, wherein the second color SG sticking step is implemented after both of the SG sticking step and the first color SG sticking step.

<3> Another aspect of the present invention is the method of producing a tire according to the item <1> or <2>, wherein a second color cover rubber sticking step in which a cover rubber of the second color is applied outside of the sidewall rubber of the second color is implemented after the second color SG sticking step and before the first cover rubber sticking step.

<4> Another aspect of the present invention is the method of producing a tire according to the item <3>, wherein the thickness of the second color cover rubber is larger than the thickness of the rubber ribbon for the sidewall rubber of the second color.

<5> Another aspect of the present invention is the method of producing a tire according to the item <4>, wherein each of the cover rubbers of the first and second colors is a sheet rubber.

<6> Another aspect of the present invention is the method of producing a tire according to the item <5>, wherein said sheet rubber is a spliced seat rubber in which side faces of multiple rubber ribbons are mutually joined.

EFFECT OF THE INVENTION

According to the aspect <1>, on the occasion when the chafer rubbers or sidewall rubbers of the second color are stuck, the chafer rubbers or sidewall rubbers of the second color are applied to be adjacent to each other, so that the sidewall rubber 92A of the first color which is applied in the conventional method of production can be eliminated. This reduces the number of bumps at the border between the rubber members and suppresses defects such as trapped air and a bare. The elimination of the sidewall rubber 92A can also reduce the difference in the productivity relative to that of the uncolored tire. As a result, the above-mentioned problems which the conventional art possesses can be suppressed.

According to the aspect <2>, the second color SG sticking step is implemented after both of the SG sticking step and the first color SG sticking step, so that, in a transverse section of the tire, an inner side of the sidewall rubber of the second color can be shorter than its outer side in the width direction of the tire. This can make the sectional area of the rubber of the second color, of which unit cost of material is high, as smaller as possible and can contribute to the reduction of the material cost.

According to the aspect <3>, a cover rubber of the second color is applied, prior to sticking the cover rubber of the first color, onto the outside of the sidewall rubber of the second color which is formed by winding a rubber ribbon, so that even if surface asperity remains in the sidewall rubber of the second color, which is formed of the rubber ribbon, after subjected to heat and pressure during the vulcanization of the green tire, the surface of the rubber of the second color including the cover rubber of the second color after the vulcanization can become a sufficient smooth surface by infilling the concave portion through a flow of the softened cover rubber of the second color. This can prevent the letter or pattern of the second color allowed to appear in the second color tinting step from occurring corrugations and undulations to thereby improve the appearance and definition of the letter or pattern, and can prevent the product tire from occurring side cracks to thereby improve the durability of the side portion of the tire.

In this connection, the following is a problem in the case where the cover rubber of the first color is stuck directly onto the sidewall rubber of the second color consisting of the rubber ribbon without applying the cover rubber of the second color. When the sidewall rubber 93 of the second color is formed by winding and laminating the rubber ribbon 83 as shown in FIG. 2(c), vortex rows of convexo-concave are formed on the surface of the sidewall rubber 93 due to the winding of the rubber ribbon 83 and they cannot be a sufficient flat surface even after subjected to heat and pressure during the vulcanization. As a result, when the top portions of the convex 96 of the vulcanized tire are removed by buffing or the like to show the sidewall rubber portion 93a of the second color, corrugations, undulations or the like occur at the profile line of the letter or pattern to thereby result in overall fuzziness of the letter. Accordingly, there has been a problem that the appearance and definition of the letter are lowered.

On the other hand, when the rows of convexo-concave remain in the exposed sidewall rubber portion 93a of the second color of the product tire, it can be another problem that a side crack is likely occur at there and decrease of the durability of the sidewall is inevitable. As already mentioned, the aspect <3> is preferable since it can effectively deal with such a problem.

According to the aspect <4>, the thickness of the second color cover rubber is larger than the thickness of the rubber ribbon for the sidewall rubber of the second color, so that infilling the concave portion of the sidewall rubber after vulcanizing the tire which is mentioned above can be smoothly and sufficiently conducted.

According to the aspect <5>, each of the cover rubbers of the first and second colors is a flat sheet rubber, so that occurrences of the convex and concave portions due to a presence of the sheet rubber itself in the production tire can be prevented and the white cover rubber can sufficiently exert the function of infilling the concave portions.

According to the aspect <6>, the flat sheet rubber is a spliced seat rubber in which side faces of multiple rubber ribbons are mutually joined, so that a special equipment for extruding a wide sheet rubber having a given width can be rendered and the sheet rubber can be made up by the rubber ribbon used for the formation of the sidewall rubber of the second color in the process of building the green tire.

Figure 1:
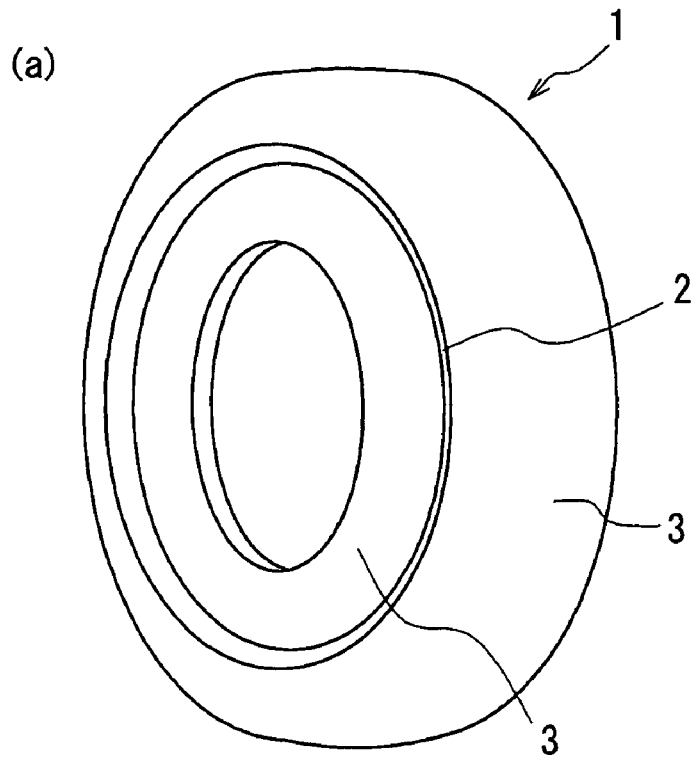
FIG. 1 is a perspective view showing a tire built by a production method according to the present invention.
Figure 1:
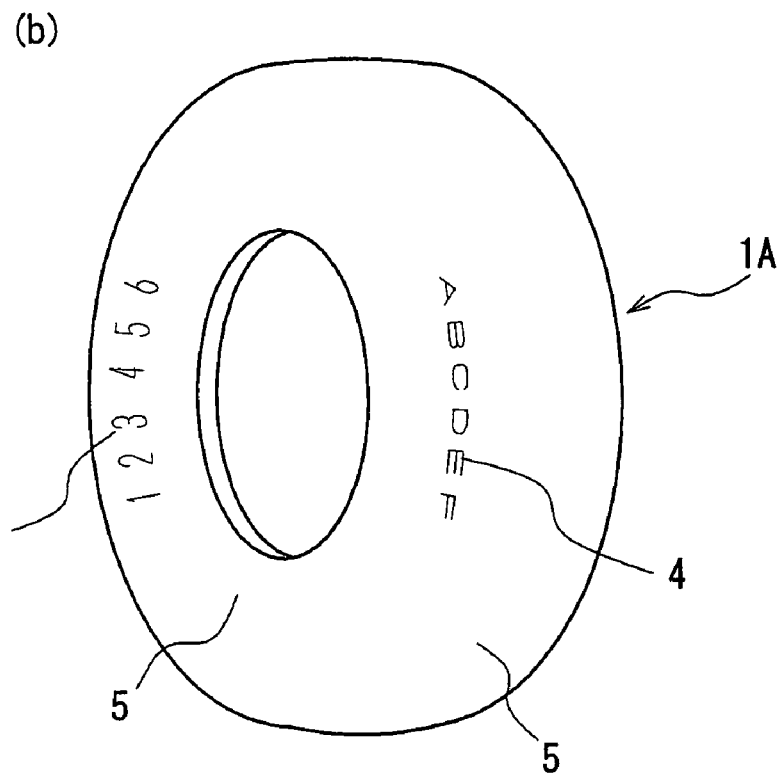
Figure 2:
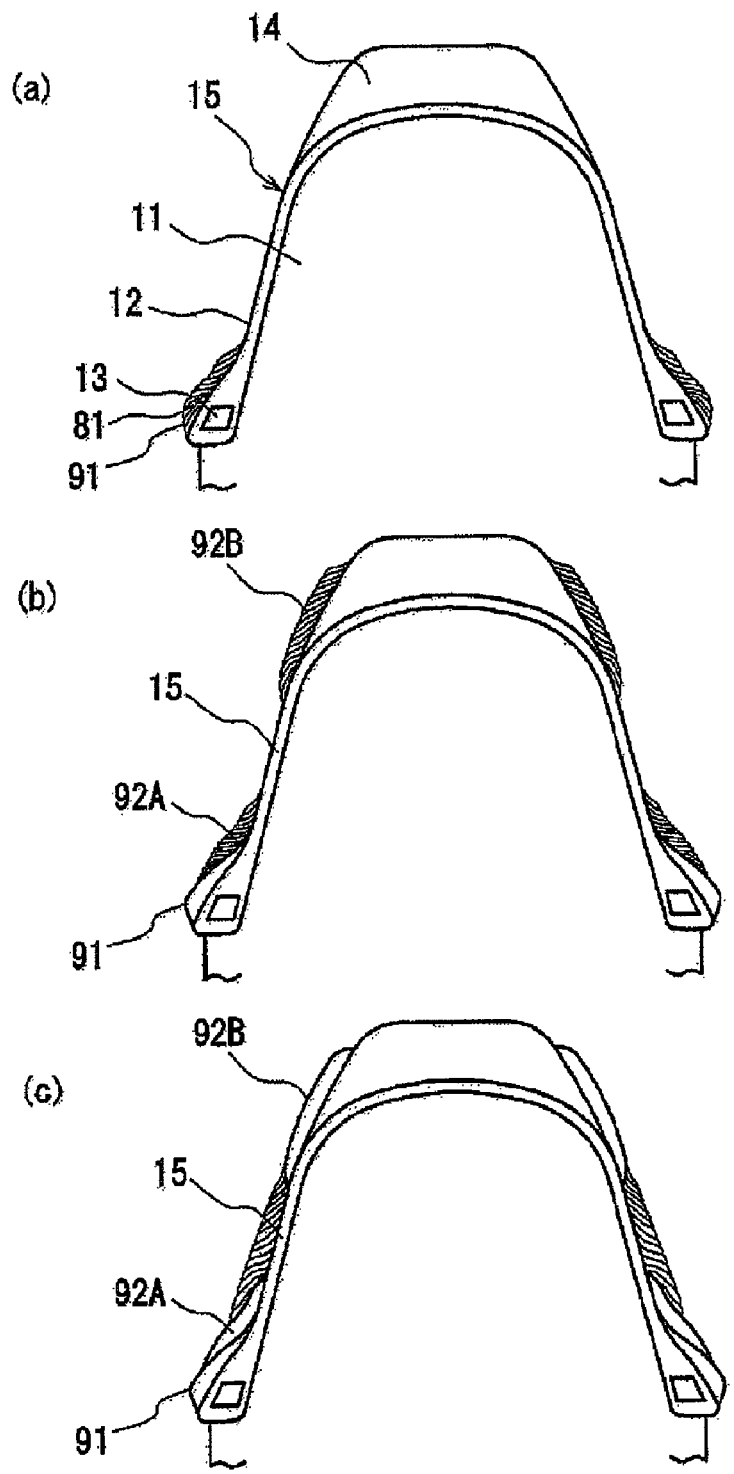
FIG. 2 is a cross-sectional view showing a tire in the course of its production in each process step according to a conventional tire production method.
Figure 3:
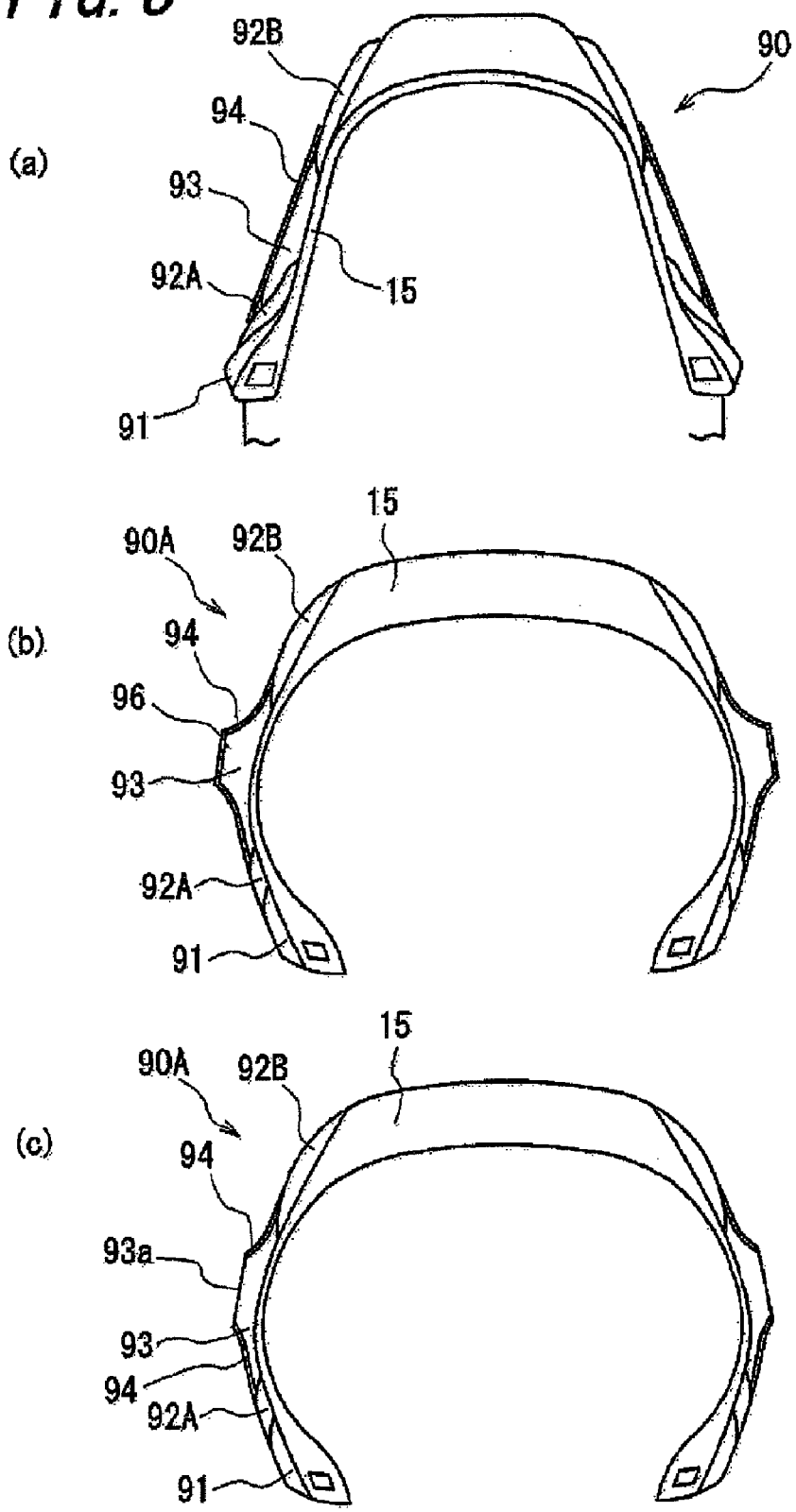
FIG. 3 is a cross-sectional view showing a tire in the course of its production in each process step following the step shown in FIG. 2.
Figure 4:
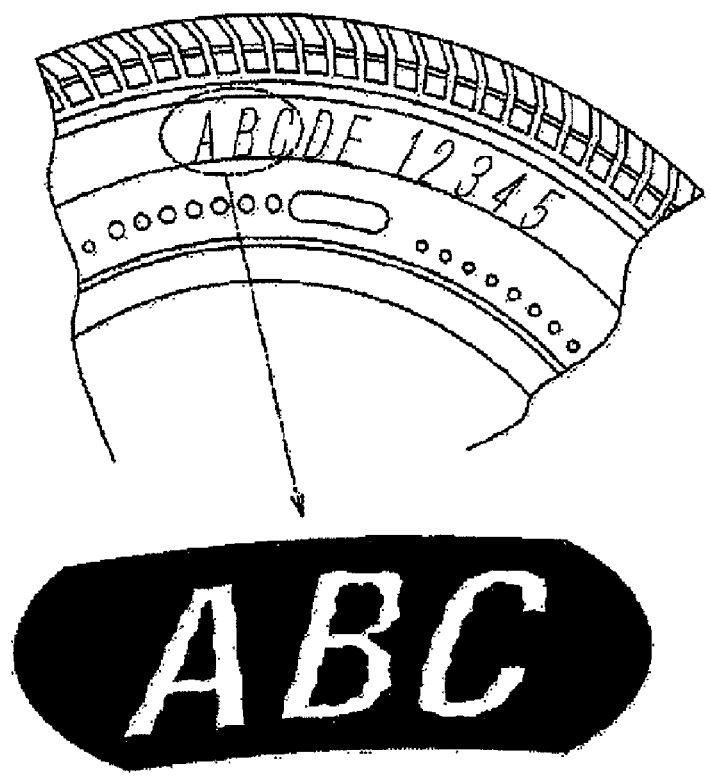
FIG. 4 shows an example of letters of the second color shown in a tire built according to a conventional tire production method.

REFERENCE SYMBOLS 1, 1A tire
2 annular line
3 surrounding portion of the first color
4 letter
5 surrounding portion of the first color
11 core body
12 carcass
13 bead core
14 tread
15 base
20 green tire
21 chafer rubber
22 sidewall rubber of the first color
23 sidewall rubber of the second color
24 cover rubber of the first color
27 cover rubber of the second color
24 rubber ribbon
30 green tire
31 chafer rubber
33 sidewall rubber of the second color
34 cover rubber of the first color
40 green tire

BEST MODE FOR CARRYING OUT THE INVENTION

Figure 5:
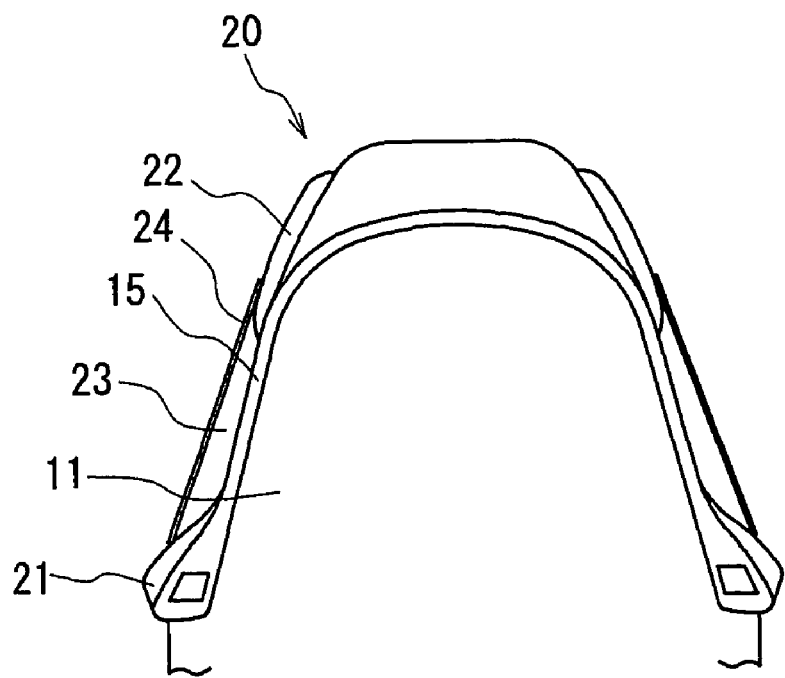
FIG. 5 is a cross-sectional view showing a green tire built by a first embodiment of the present invention.

Embodiments of the present invention are discussed with reference to the drawings. FIG. 5 is a cross-sectional view showing a green tire built by a first embodiment of the present invention. In order to build a green tire 20, as already mentioned in connection with the conventional art, a base 15 is firstly formed by applying a carcass 12, both bead cores 13 and a tread 14 as well as tire component members such as an inner liner and belts onto a core body 11 which consists of a building drum or rigid core and has a exterior shape approximate to the interior surface of a product tire and then a rubber ribbon is winded spirally to apply a chafer rubber 21.

The step of sticking the chafer rubber 21 is referred to as CG sticking step. After or before the CG sticking step, a sidewall rubber 22 is applied onto the base 15 at a position spaced from the position where the chafer rubber is stuck by winding a rubber ribbon spirally, which is referred to as a first color SG sticking step. It is noted that which of the CG sticking step and the first color SG sticking step coming earlier can be determined appropriately depending on a production environment.

Thereafter, the rubber ribbon is winded spirally to fill the area formed between the chafer rubber 21 and the sidewall rubber 22 to thereby stick a sidewall rubber 23 tinted in the second color. This is the second color SG sticking step. The second color SG sticking step is implemented preferably after the CG sticking step and the first color SG sticking step, but it may be prior to at least one of these steps. In the latter case, along with the change of the order of the sticking, the direction of inclination of the borderline between the rubber members of which the order is reversed has to be inverted with respect to the radial direction in order to be able to laminate the rubber ribbon.

In the subsequent first color cover rubber sticking step, a cover rubber 24 of the first color is applied such that the sidewall rubber of the second color is covered by winding, for example, a sheet rubber once to thereby build a green tire 20 shown in FIG. 5.

After building the green tire 20, the green tire is vulcanized in a mold which has a concave portion corresponding to a portion desired to be shown as the letter or pattern of the second color. In the second color tinting step, the top of a convex portion of a tire corresponding to the concave portion of the mold is removed to allow the letter or pattern of the second color hidden beneath the top of the convex portion to appear. At this point, the building of tire is completed.

Figure 6:
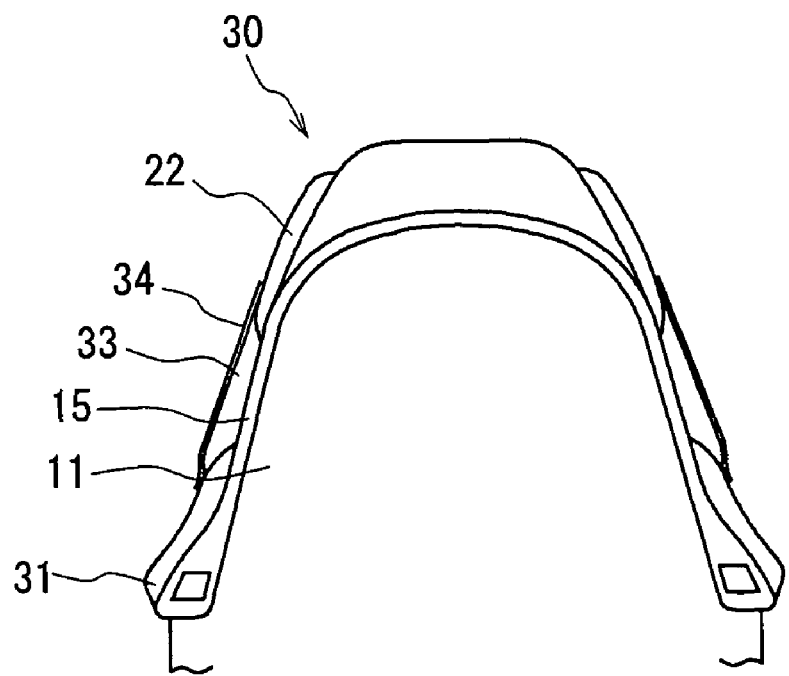
FIG. 6 is a cross-sectional view showing a green tire built by a second embodiment of the present invention.

FIG. 6 is a cross-sectional view showing a green tire 30 built by a second embodiment of the tire producing method. The radially outside of the chafer rubber 21 usually ends near the position corresponding to the flange of the rim to which the tire is mounted, as shown in FIG. 5, but in the green tire 20 of the second embodiment, the terminal end of the chafer rubber 31 may be placed far outside of the position corresponding to the flange of the rim.

Figure 7:
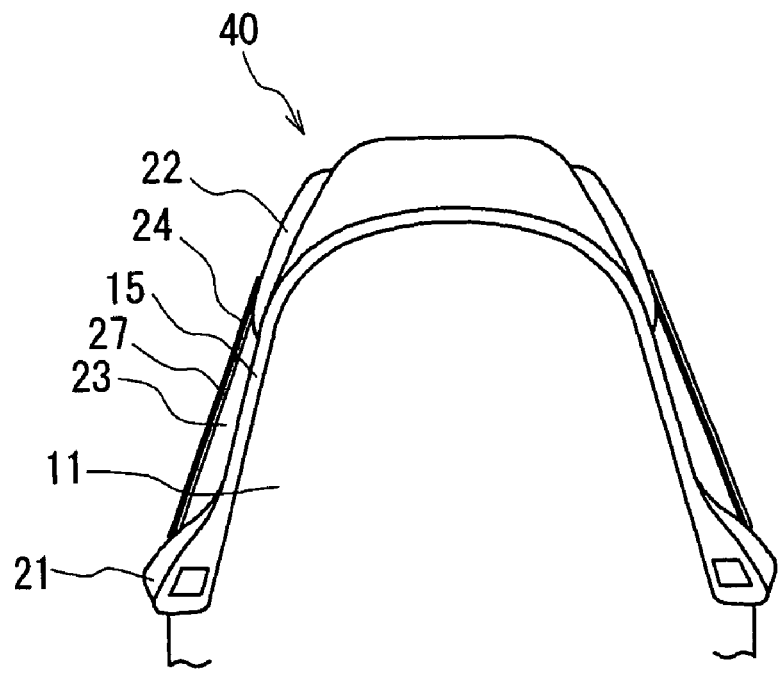
FIG. 7 is a cross-sectional view showing a green tire built by a third embodiment of the present invention.

FIG. 7 is a cross-sectional view showing a green tire built by a third embodiment of the tire producing method. The steps of building a green tire 40 is different from the steps of the first embodiment of the producing method only in a point that the second color cover rubber sticking step in which a cover rubber 27 of the second color is applied by winding a sheet rubber once is implemented after the second color SG sticking step in which a sidewall rubber 23 tinted in the second color is applied by winding a rubber ribbon spirally and before the first color cover rubber sticking step in which a cover rubber 24 tinted in the first color is applied. With adding this step, the profile line of the letter or pattern of the second color appeared in the second color tinting step can be prevented from occurring corrugations undulations or the like, and the side crack can be advantageously prevented.

Figure 8:
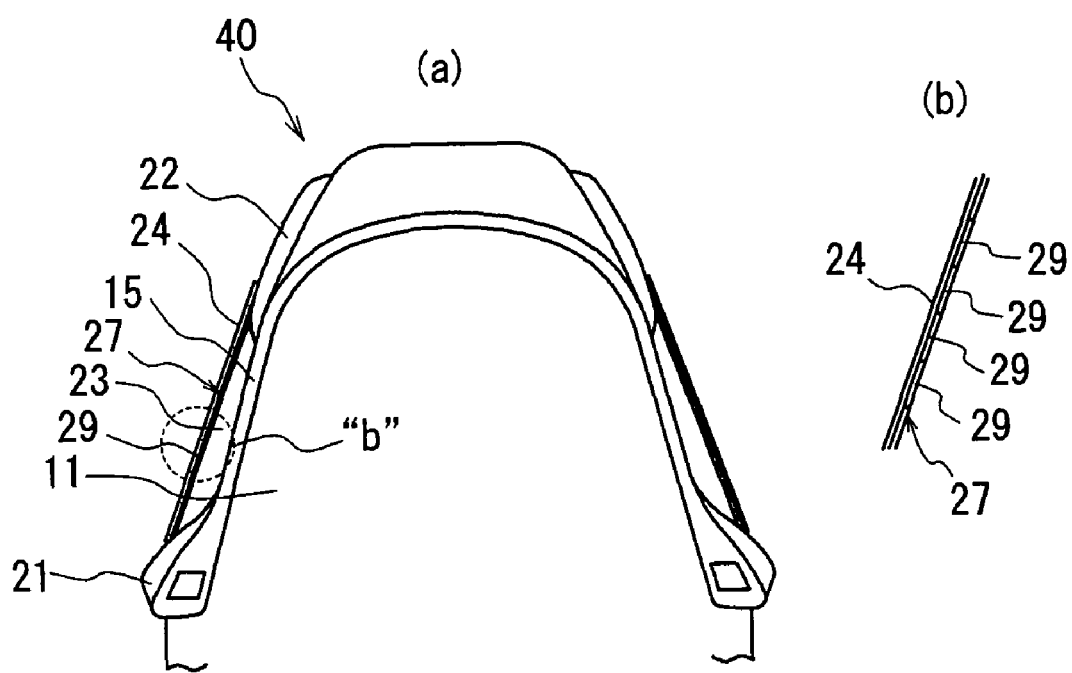
FIG. 8 is a cross-sectional view showing a modified example of a green tire built by a third embodiment.

Preferably, each of the second color covers rubber 27 and the first color cover rubber 24 is a sufficiently flat single sheet rubber. In this case, each rubber sheet may be made of, for example, a unit rubber sheet, as shown in FIG. 7, which is integrally formed by a extrusion or the like, or it may be a spliced sheet rubber in which side faced of multiple rubber ribbons 29 are mutually joined, as shown in FIG. 8.

When the green tire 40 thus built is subjected to be vulcanized in a vulcanization mold to produce a product tire, the second color cover rubber 27 causes fluidized deformation to infill rows of concaves on the surface of the second color sidewall rubber 23. As a result, the surface of the second color rubber of the product tire including the second color cover rubber 27 becomes a sufficiently flat surface. Thus, when a brand name, other letters and symbols formed as convex bumps on the sidewall of the product tire through the vulcanization are exposed in white by, for example, buffing the first color cover rubber 24, the profile line of the letters can be definitely highlighted to thereby improve the appearance and definition of the letters.

In addition, the above-mentioned infilling of rows of concaves of the second color cover rubber 27 can prevent stress concentration on the surface of the second color rubber or the like exposed by buffing, so that the cracks can be advantageously prevented from occurring at the side portion of the product tire to thereby bring improved durability of the side portion.

In the above description, three embodiments have been exhibited. One of the technical features of the present invention is that the chafer rubber 21 or 31 and the sidewall rubber 23 or 33 of the second color are adjacently arranged in any of green tires 20, 30 and 40 built by the production method of these embodiment. With this feature, as compared to the conventional method in which two first color sidewall rubber in an annular shape have to be applied at positions spaced in the radially inside and outside, only an outer sidewall rubber 22 is enough for the present invention. As a result, even when the rubber member is stuck in the colored tire by winding the rubber ribbon spirally, it can be produced without involving defects such as trapped air and a bare in the sidewall as well as severe decrease of the productivity.

The letter or pattern of the second color provided for improving designability is often arranged in a region outside of the radial position corresponding to the maximum width of the tire. Even in this case, the chafer rubber 21 or 31 and the sidewall rubber 23 or 33 can be adjacently arranged, which can also achieve the above-mentions object of the present invention. It is noted that in the above-mentioned embodiments, black may be recited by way of most common example of the first color, while white may be recited by way of most common example of the second color. The present invention, however, is not limited to these colors.

INDUSTRIAL APPLICABILITY

The method of producing a tire according to the present invention is applicable for not only, of course, various passenger vehicle tires but also for various kinds of tires such as motorcycle tires.

The invention claimed is:

1. A method of producing a tire having a pair of rubber chafers which are arranged outside, in a width direction, of each of bead cores locking both ends of a carcass and which are tinted in a first color, and a pair of sidewalls which are arranged adjacently outside, in a radial direction, of each of the rubber chafers and which are also tinted in the first color, at least one of the sidewalls being provided with a rubber portion which is shown as letters or pattern of a second color, the method comprising:
   a CG sticking step in which a chafer rubber is applied by spirally winding a rubber ribbon onto a base consisting of members including said carcass and said bead core;
   a first color SG sticking step in which a sidewall rubber of the first color is applied by spirally winding a rubber ribbon at a position on the base spaced from the position where the chafer rubber is stuck;
   a second color SG sticking step in which a sidewall rubber of the second color is applied by spirally winding a rubber ribbon between the chafer rubber sticking position and the first color sidewall rubber sticking position;
   a first color cover rubber sticking step in which a cover rubber of the first color is applied over the entire surface of the sidewall rubber of the second color;
   a vulcanizing step in which the tire is vulcanized in a mold having concave portion corresponding to the letter or pattern of the second color; and
   a second color tinting step in which the letter or pattern of the second color is allowed to appear by removing at least a part of a convex portion of a tire corresponding to the concave portion of said mold;
   wherein, when said chafer rubber and sidewall rubber of the second color are applied, said chafer rubber and sidewall rubber of the second color are applied so that they are adjacent to each other, wherein a second color cover rubber sticking step in which a cover rubber of the second color is applied outside of the sidewall rubber of the second color is implemented after the second color SG sticking step and before the first cover rubber sticking step, wherein the second color cover rubber is applied to cover the entire surface of the sidewall rubber of the second color.

2. The method of producing a tire according to claim 1, wherein the second color SG sticking step is implemented after both of the CG sticking step and the first color SG sticking step.

3. The method of producing a tire according to claim 1, wherein the thickness of the second color cover rubber is larger than the thickness of the rubber ribbon for the sidewall rubber of the second color.

4. The method of producing a tire according to claim 3, wherein each of the cover rubbers of the first and second colors is a sheet rubber.

5. The method of producing a tire according to claim 4, wherein said sheet rubber is a spliced sheet rubber in which side faces of multiple rubber ribbons are mutually joined.

\* \* \* \* \*